Oct. 4, 1932.  E. J. W. RAGSDALE  1,880,478
AIRPLANE STRUCTURE
Filed May 3, 1929  2 Sheets-Sheet 1

INVENTOR:
Earl J. W. Ragsdale,
BY
ATTORNEY.

Oct. 4, 1932. E. J. W. RAGSDALE 1,880,478
AIRPLANE STRUCTURE
Filed May 3, 1929  2 Sheets-Sheet 2

INVENTOR.
EARL. J.W. RAGSDALE
BY
ATTORNEY.

Patented Oct. 4, 1932

1,880,478

UNITED STATES PATENT OFFICE

EARL J. W. RAGSDALE, OF NORRISTOWN, PENNSYLVANIA, ASSIGNOR TO EDWARD G. BUDD MANUFACTURING CO., OF PHILADELPHIA, PENNSYLVANIA, A CORPORATION OF PENNSYLVANIA

AIRPLANE STRUCTURE

Application filed May 3, 1929. Serial No. 360,140.

The truss of my invention is a truss adapted to constitute an airplane rib. But quite obviously it has other adaptations. Airplane ribs as at present constructed are constructed of relatively light metal members of material of relatively thin gauge. But the principles employed in my invention may be applied with or without modification to heavy members of relatively greater section and thicker gauge.

The outstanding object of my invention is the provision of the lightest possible truss of the required strength to meet engineering specifications by the cheapest possible method. Lightness requires proper distribution of the mass of metal used both in the sections of the members and their points of juncture with each other and a distribution moreover so gradiently distributed longitudinally of the members on either side of the joint and in between the joints as to fully conform to engineering specification requirements. It also requires choice of metal having the greatest unit strength to unit weight ratio consistent with those methods of fabrication necessary to distribute the mass of metal and properly join it together into the truss structure. These conditions directly affect the cheapness of the product. Cheapness enters in the choice of the sections in the ingenuities of joining them together, through which the fabrication and joinder possible with the material used can be most efficaciously, simply and cheaply carried out.

It is these ends and aims which I have had throughout my invention. I attain them in part by utilizing members of hollow cross section complementally flattened at their points of attachment to each other substantially in the plane of the peripheral members, in part by gradiently flattening the members as to points of attachment are approached from either side, in part by reinforcing them in the points of attachment, in part by gradiently diminishing the reinforcement of the points of attachment as the points of attachment are receded from on either side, in part by constituting the reinforcement an auxiliary section of hollow form within the flattened portions, in part by making this reinforcement in the form of inwardly directed complemental beads nested together in the flattened portions, in part by spot welding parts together in the flattened portions on either side of the reinforcement in which place the spot welds are entirely accessible, and in part by constituting the peripheral members of the truss in one piece and the cross bracing of the truss in the main of one piece, the portions being reversely bent to effect the inter-bracing engagement.

The embodiment shown in the drawings is an embodiment in an airplane rib.

Figure 1 delineates the rib in side elevation.

Figure 2 a cross section of the perimetral member.

Figure 3 the hollow cross section of the interbracing member.

Figure 4 delineates the gradiently flattened portion of the perimetral member with its bead reinforcement.

Figure 1:
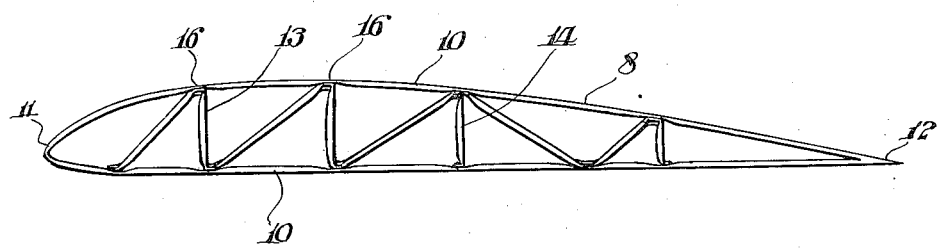
Figure 2:
Figure 3:
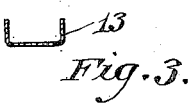

Figures 8 to 11 are views of another embodiment. They show perspectively a rib in side elevation, a general joint looking in the direction of the line 9—9 of Fig. 1, the portion underlying the front spar looking in the direction of the line 10—10 and a portion underlying the rear spar looking in the direction of the line 11—11.

Figure 8:
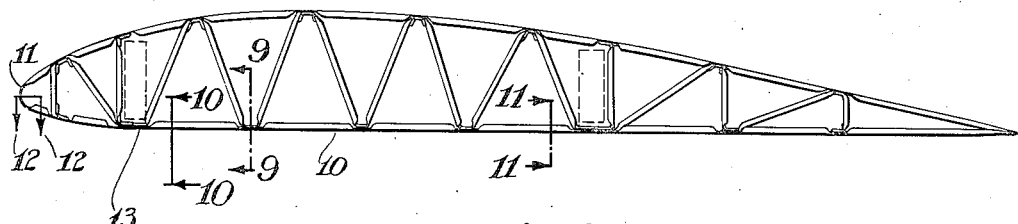
Figure 9:
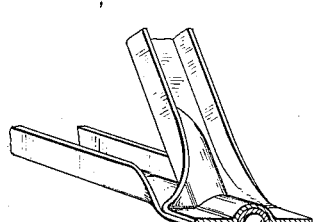
Figure 12:
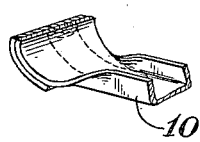

Figure 12 is a perspective view along the line 12—12 of Figure 8.

10 is the perimetral member in one piece reversely bent upon itself at the nose 11 of the rib and having its ends secured together at the tail 12 of the structure. The interbracing structure is designated 13 and is comprised in the main of one piece, in entirety of one piece in the form shown excepting the vertical member 14 which is in the form of an individual upright.

The members are of channel cross section in the form shown, but they may be of any other form of hollow construction as for example angle cross section T or I or tubular cross section and the like. The bottom of the channel 15 of the perimetral member 10 constitutes its outer periphery and is truly of the form desired for the exterior of the rib.

Figure 4:
Figure 5:
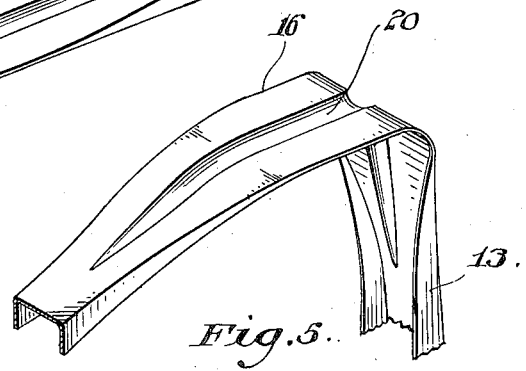
Figure 5 is the complemental gradiently flattened portion of the reverse bend of the inter-bracing member with its complemental reinforcing bead.
Figure 7:
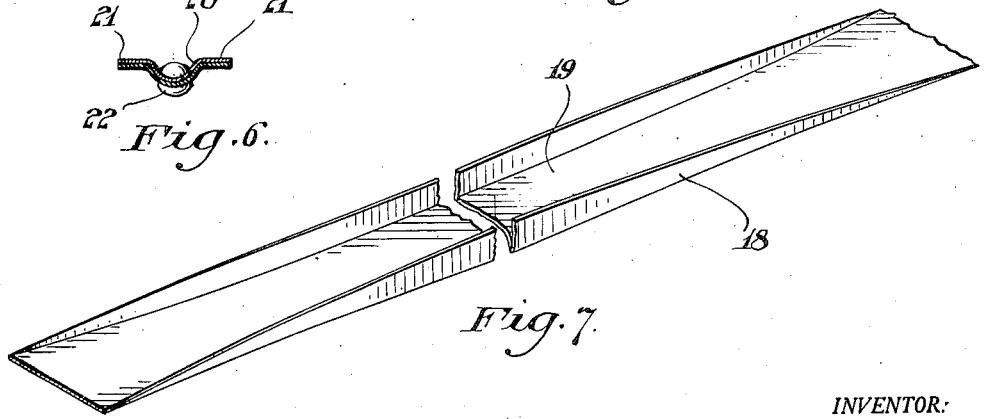

At the points of attachment to each other, designated 16, the members are flattened as clearly appears in Figs. 4 and 5 which are respectively sectional perspective views of members 10 and 11 at one of the joints 16. This flattening at the joints is gradiently developed by gradiently outwardly turning the side walls 17 of the section, the flattened portion gradiently approaching the full flattened cross section of the joint. In the case of the inter-bracing member 13 the flattened portion extends entirely around the reverse bend of the member. The portions intermediate the joints, as for example, the intermediate portion 18 shown in perspective in Fig. 7, on gradient flattening may or may not emanate midway between joints as indicated. When it does so emanate, the bottom of the channel itself may be gradiently narrowed as shown at 19 whereby to lengthen its side walls and give the hollow section its greatest depth midway between joints.

Figure 6:
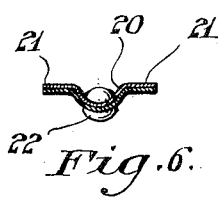
Figure 6 shows an auxiliary means of attaching the members together in the form of a rivet and Figure 7 is a perspective of a gradiently developed section of the part between joints.

In the flattened portions of the joints and adjoining them the members are provided with a reinforcement 20. In the embodiment shown, this is in the form of complemental inwardly directed beads nested within each other as shown in Fig. 6. These reinforcements are gradiently washed out as they recede from the region of full flattening at the joints and in the hollow sections of the members between the joints as clearly appears in Figs. 4 and 5.

The bent ends of such individual members as 14 are formed in all respects similarly to the corresponding portions of the inter-bracing member 13, as for example, the upright portions, the ends being gradiently flattened and reversely gradiently reinforced.

The members are fastened together at their points of attachment by spot welding together the flattened portions at 21 or by riveting them together as at 22 in the bottoms of the beads 20 as appears in Fig. 6. In the instance of the weld the flattened section of the joint renders them openly accessible to the most intimate spot welding, while the inwardly directed bead enables the rivets to be seated in the depression of the bead and frees the structure from protruding rivet heads.

I have found that such a structure attains every aim and object of my invention. Because of the innate simplicity of the joints, perfect distribution of the mass of metal employed is derived. By reason of this simplicity, in conjunction with the simplicity of the work upon the hollow sections and its moderateness, I may use material of very high tensile strength without being hampered by difficult workability. I have found further that such metal so perfectly worked in this simple form can be perfectly spot welded together. Yet further, I have found that by a substantially uniform system of dies applicable to all joints alike, and an extremely simple system of jigs, the tool cost for fabrication and assembly is reduced to a minimum and the time and labor of assembly is reduced over and above that great reduction in time and labor effected by the continuous formation of members 10 and 13. Yet further, the structure has proven susceptible to quantity production by step by step and rotary die operations.

Figure 10:
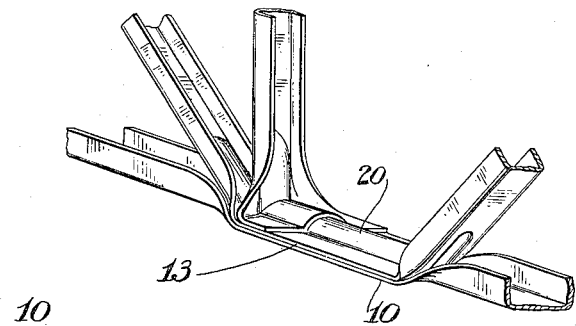
Figure 11:
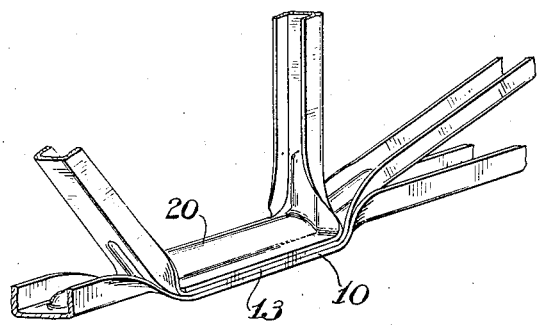

The embodiment of Figs. 8 to 11 is a refinement of Figs. 1 to 7 and indicates the susceptibility to refinement and adaptation to various kinds of trussing. The truss shown here is in the main the Warren truss. The nose 11 is flattened and rounded as appears in Figs. 8 and 12. It may or may not be provided with the reinforcing beads as are the other sections and as indicated in dotted lines. In the region of the front wing beam, indicated in dotted lines, there is an extended flattened portion of the member 10 and the member 13 where they are joined to each other. This is shown in Figs. 8 and 10. There is a similar extended flattened portion of members 10 and 13 at the rear beam also shown in dotted lines. This is shown in Figs. 8 and 11. The re-entrant beads 20 may or may not be used but preferably are used at these points. The extended flattened portion admits of the snug fitting of the rib structure about the beam and a more ready securement of the rib structure to the beam in each case. In this embodiment also the parts are shown as welded together throughout.

Any modifications of which my invention may be susceptible without departing from its generic spirit I claim within the purview of the annexed claims.

What I claim as new and useful and desire to protect by Letters Patent is:—

1. A truss comprising members of hollow section flattened in and by degrees as they approach the points of attachment to each other, which flattened portions are provided with auxiliary reinforcing sections of hollow form of full depth at the points of attachment and gradually flattening out inversely as the flattening out of the portions flattened by degrees which they enter.

2. A truss structure comprising members of channel cross section flattened at their points of attachment to each other and by degrees as they approach each other, and a bead extending substantially throughout said flattened portions and fading out as it enters the body of the channel shape cross section.

3. A truss structure comprising members of open hollow cross section flattened out in their points of attachment to each other and longitudinally extending complemental beads in the members extending through the flattened portion and to a distance beyond in the adjoining portions of each member.

4. A truss comprising outer and inner members of hollow cross section, the outer member of which opens inwardly of the truss, said members being flattened out at the joints and provided with complemental inwardly directed beads in the flattened portions nested within each other.

5. A truss structure in the form of an airplane rib the members of which are of open hollow cross section and the peripheral and cross members of which are respectively in the main of continuous pieces, the continuous pieces of the cross member being reversely bent to form points of attachment to the peripheral member and both of which members are flattened out at their points of attachment in the plane of the main body of the peripheral member and joined together in the flattened portions.

6. A truss structure in the form of an airplane rib the members of which are of open hollow cross section and the peripheral and cross members of which are respectively in the main of continuous pieces, the continuous pieces of the cross member being reversely bent to form points of attachment to the peripheral member and both of which members are flattened out at their points of attachment in the plane of the main body of the peripheral member and joined together in the flattened portions, and are further provided in the flattened portions with complemental inwardly extending beads nested together.

In testimony whereof he hereunto affixes his signature.

EARL J. W. RAGSDALE.